Patented July 20, 1937

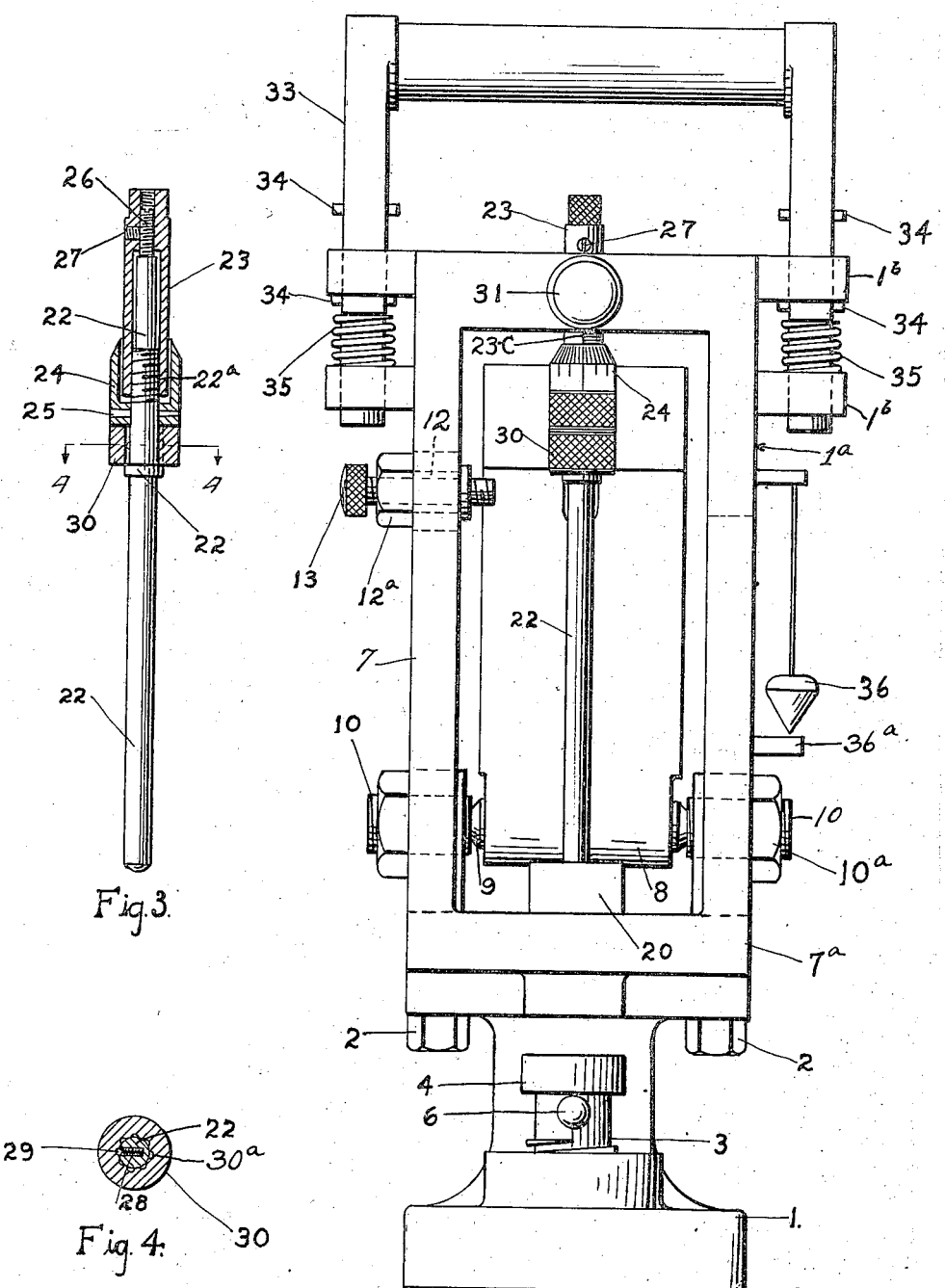

2,087,566

UNITED STATES PATENT OFFICE 2,087,566

HARDNESS TESTER

Don W. Blevans, Tulsa, Okla.

Application September 28, 1935, Serial No. 42,687

12 Claims. (Cl. 265—13)

This invention relates to hardness testers designed for testing the hardness of metal objects and particularly to testers of the indentation type wherein an indentation point is driven into the metal, the depth of the indentation so made being indicative of the specific hardness of that particular object.

The general object of my invention is to provide a hardness tester of this character which includes an indentation point, a hammer having predetermined weight which, falling a predetermined distance, drives the point into the metal a distance depending on the hardness of the metal and micro-metric means for measuring the depth of such indentation so made.

Another object is to provide means for initially forcing or driving the point down against the object being tested with sufficient force as to smooth out any minute irregularities under the point, said means also causing the point to break through the oxide or surface skin of the metal being tested, thus bringing the point, before being driven downward by the hammer or weight, into contact and against virgin metal, resulting in a more accurate testing of the object when the weight falls.

A further object is to provide a tester of this character having means whereby it is possible to vary the height from which the weight or hammer falls before striking the plunger carrying the indentation point.

Another object is to provide a hardness tester of the character stated wherein the weight, in falling, strikes the plunger at substantially 90° from its vertical center line, the plunger having a head convexly rounded upon its upper surface, the convexity of the upper surface of the plunger having a small enough radius to assure that the weight will strike the plunger substantially at the axial center line and substantially at the plunger's center of gravity, regardless of any small variation in the position of the plunger.

A further and more specific object is to provide a hardness tester having an indentation point with means whereby it is possible to hold the indentation point up in the frame of the tester to thereby protect the indentation point from any damage when not in use and, in this connection, to provide the indentation point with a compression spring which, when the plunger is released, allows the indentation point to strike the object being tested with enough force to smooth out irregularities under the point and break through the surface skin of the object.

A further object of the invention is to provide a micrometer depth gauge as part of the tester, which gauge is slidably attached to the frame of the tester and which is provided with means whereby the gauge may be set in exactly the position in which the gauge reads zero.

A further object is to provide a hardness tester wherein the base of the tester may be entirely removed to thus permit the tester to be used on objects too large to be inserted between the indentation point and the base or anvil of the tester and in this connection to provide a carrying handle and also provide coil springs associated with the carrying handle and with the upper portion of the tester in such a manner that the coil springs may be compressed by pushing down on the handle when the tester is in use, said coil springs, when compressed, exceeding in compressive force the kinetic force caused by the weight falling and striking the plunger, and exceeding any other forces which might have a tendency to lift the tester off the subject being tested.

Other and more specific objects will be stated in the course of the following description.

My invention is illustrated in the accompanying drawings wherein:

Figure 2 is a front elevation thereof;

Figure 3 is a detailed sectional view of the micrometer gauge, the spindle of the gauge being in elevation;

Figure 4 is a section on the line 4—4 of Figure 3.

Figure 1:
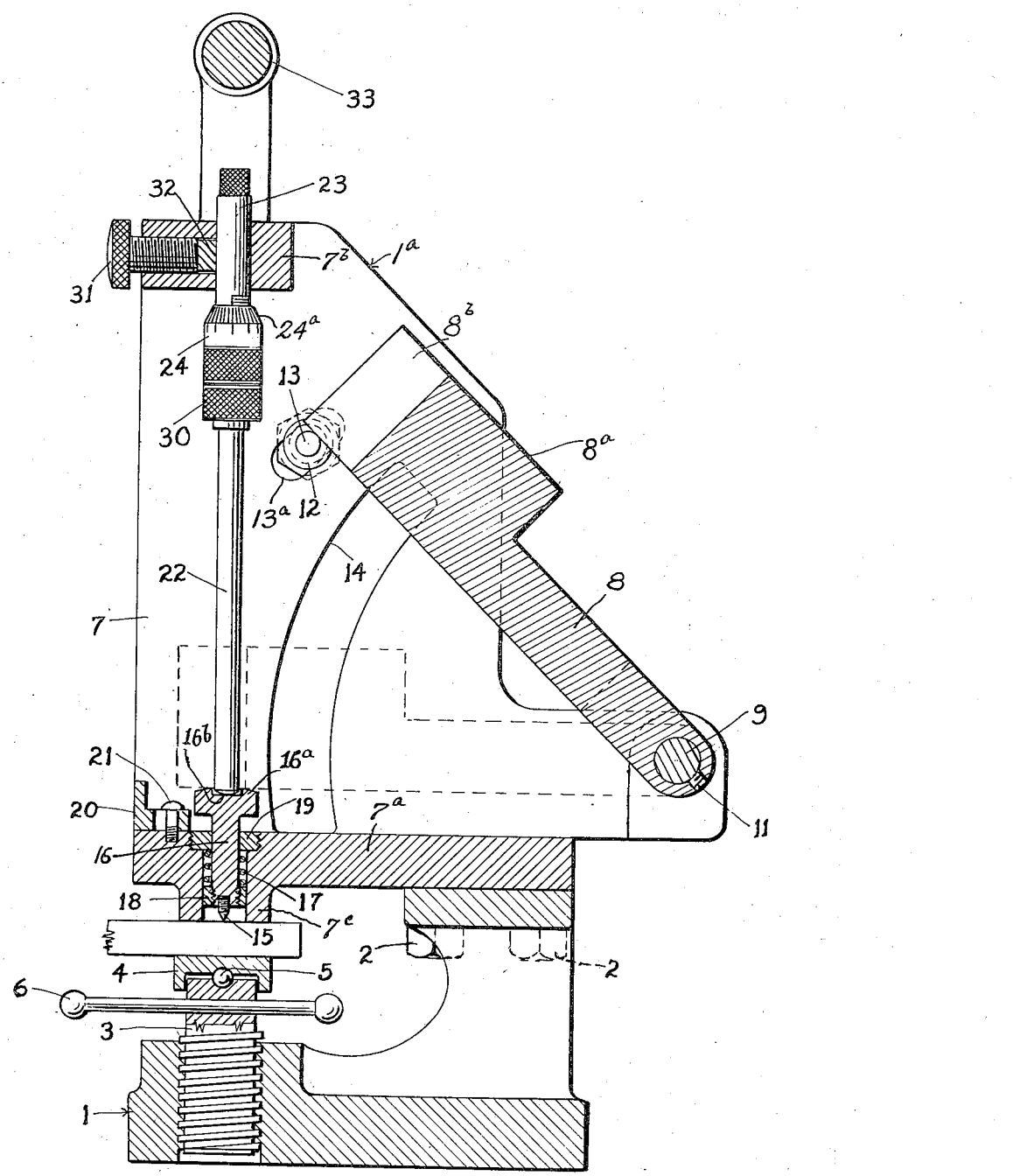
Figure 1 is a medial vertical sectional view through a hardness tester constructed in accordance with my invention.

As illustrated in Figure 1, the tester consists of a base 1, and an upper frame designated generally 1ª. The upper frame 1ª is engaged with the base 1 by means of the cap screws 2. The base 1, at one end, is formed to provide a gooseneck supporting the upper frame 1ª and the base so designed as to allow it to be firmly bolted down to a table or bench, the gooseneck permitting the easy removal of the cap screws 2. Extending through the base is the lifting screw 3 having at its upper end the handle 6 which slides longitudinally through the upper end of the lifting screw. Resting upon the lifting screw is the anvil 4 supported upon a central ball bearing 5. This ball bearing 5 permits the anvil 4 to vary with any irregularities of the subject being tested, thus assuring that the subject will be rigidly held up against the tester for the entire area of the anvil 4. This central ball bearing 5 also has a tendency to prevent the anvil 4 from turning with the lift screw 3 when clamping a subject in the tester. It is obvious that the anvil 4 can be designed for different shapes of objects being tested.

The hardness tester proper consists of the upper frame 1a having the lateral walls 7. These walls are connected at their lower ends by the transverse web 7a and at their upper ends by the transverse web 7b. The walls 7 and the webs 7a and 7b are preferably integral. Extending between rearward prolongations of the walls 7 is a shaft 9 upon which a hammer 8 is mounted, the hammer operating between the walls. The outer end of the hammer is formed to provide a head 8a of predetermined weight, this head at its outer end being forked, as at 8b, for a purpose to be later stated. The hammer is held to the shaft 9 by means of set screw 11 or any other suitable means. The shaft 9 is pointed at its ends and operates in the screw threaded bearings 10 which extend through the side walls 7 of the frame 1a, these bearings being held in adjusted position by means of the binding nuts 10a. Thus these bearings may be adjusted from time to time to take up wear and yet permit the free falling of the weight or hammer. One of the walls 7 is provided with a slot 13a. Through this slot is disposed a tubular locking bolt 12 having a head on its inside face and a nut 12a bearing against the side face of the wall 7. This tubular locking bolt may thus be adjusted within the slot 13a. This slot 13a is inclined downward toward the plunger which carries the indentation point and thus the locking bolt may be adjusted toward or from the indentation point. Disposed within this tubular bolt 12 is a latching pin 13 which, as illustrated in Figure 2, normally projects inward into the path of movement of the hammer and prevents the hammer from dropping until this release pin has been withdrawn, thus providing means for holding the weight in any desired position within the limits of the slot 13a. It will be obvious that the greater the height to which the weight or hammer 8 is lifted, the greater the potential energy stored up and, conversely, by lessening the distance through which the weight 8 is to fall, a proportional decrease will take place in the potential energy stored up in the weight. Therefore, the purpose of the locking bolt 12 and the release pin 13 is to offer a means whereby the weight 8 can be held at a predetermined height for successive tests and dropped by pulling out the release pin 13. It also offers a means for varying the potential energy stored up in the weight 8 whereby to take care of any variation due to weakening of spring 17 under fatigue.

As this machine depends on a certain depth of indentation being formed in the object being tested, which object has a certain hardness, it is important that there be some means whereby the depth of the indentation can be varied so as to conform to a standard hardness test. To this end, there is mounted within the web or table 7a and immediately above the center of the anvil 4, a plunger 16. This plunger carries at its lower end the indentation point 15. The upper end of this plunger is formed with a head 16a, the center of which is provided with a recess 16b. Exteriorly of this recess the head is convexly rounded as shown clearly in Figure 1. Having screw threaded engagement with the lower end of the plunger just above the indentation point 15 is a collar 18 or follower and disposed above this collar or follower 18 is a coil compression spring 17 which bears at its upper end against a collar 19 set into and having screw threaded engagement with the web or table 7a. The upper face of this collar 19 is, of course, flush with the upper face of the web 7a. This coil spring 17 has a tendency to force the plunger 16 downwardly. For the purpose of holding the plunger up in the machine when not in use and thus protecting the indentation point from injury, I provide the latch 20 which is slidably mounted upon the upper face of the web 7a adjacent the head of the plunger by means of the screw 21. This latch is slotted and the screw 21 passes through this slot so that the latch may be shifted beneath the head 16a and thus hold the plunger raised a sufficient distance to carry the indentation point upward into spaced relation to the hub portion 7c which extends downward from the table or web 7a and which is bored to receive the collar 18 and the spring 17 and countersunk to receive the collar 19. The object of the follower or collar 18 is to permit the coil spring 17 to be assembled around the plunger 16. The coil spring 17 exerts a minimum force on the plunger 16 just sufficient to hold the identation point 15 down into the identation after the weight 8 has fallen on the plunger 16. If the plunger 16 is lifted and held up by the latch 20 and then the latch 20 is pulled back to release the plunger, the indentation point 15 will strike the object being tested with sufficient force to smooth out any minute irregularities under the indentation point 15 and to break through the surface oxide of the metal being tested, thus bringing the indentation point 15 against virgin metal in the object, resulting in more accurate tests. The weight or hammer 8 which falls on the plunger 16 is to be of such heaviness that the subject being tested will be stressed past its yielding point in the hardest metal to be tested.

When the indentation point 15 is forced into the subject being tested, a certain amount of flow takes place, the metal being stressed past its yielding point. In the near region of the indentation the metal will have a tendency to be stressed but not up to its proportional limit. Consequently, after the weight 8 comes to rest on the plunger 16, the metal will have a tendency to spring back into the space occupied before the test was taken. Therefore, the depth of the indentation will be in proportion to the amount of permanent set of the metal being tested.

As is shown in Figure 1, when the weight 8a has fallen on the plunger 16, the lower surface of weight 8 should be at substantially 90° from the vertical center line of plunger 16. This is to assure a minimum amount of friction between the plunger 16 and the collar 19 or, in other words, it is to prevent the weight from so striking the plunger as to force it laterally as well as downwardly. However, the upper surface of the head 16a has a convex curvature of a radius small enough to assure, for any small variation in the position of plunger 16, that the weight 8 will strike the plunger 16 substantially at the axial center of the plunger so as to prevent the plunger being pushed to one side as well as being pushed downward.

For the purpose of measuring the depth of the indentation formed by the point 15 in the object being tested, I provide a micrometer depth gauge shown in detail in Figures 3 and 4. In these figures and in Figure 1, 22 designates the spindle of the gauge, 23 the micrometer barrel and 24 the sleeve, the barrel 23 being extended upward through a bore formed in the web 7ᵇ. The sleeve 24 and spindle 22 are held together by means of a tapering pin 25. The spindle 22 is threaded at 22ᵃ, these threads engaging the interior of the barrel 23 and these threads having a very fine pitch. The upper end of the sleeve 24 is beveled and provided with equal graduations 24ᵃ while the micrometer barrel 23 carries a reference line 23ᶜ.

This micrometer barrel 23 also carries horizontal cross lines extending circumferentially around the barrel, the distance between these cross lines being equal to the pitch of the thread 22ᵃ on the spindle 22. When the sleeve 24 is turned one revolution, the spindle 22 advances an amount equal to the pitch of the thread on the spindle 22. Assuming that the periphery of the sleeve 24 is divided into fifty spaces by the graduations 24ᵃ, then as each division line or graduation on the sleeve 24 passes the index line 23ᶜ on the micrometer barrel 23, the spindle 22 will have advanced exactly one-fiftieth of the pitch of the thread on the spindle 22 and on the micrometer barrel 23. This construction is exactly the same as the method of construction employed on the conventional micrometer and requires no further description. In the micrometer frame 23 at its upper end there is disposed an adjustment screw 26 which is locked in place by the set screw 27. This is so adjusted that the spindle 22 is stopped by the adjustment screw 26 exactly at the position when the reading on the micrometer depth gauge is zero. Sleeve 24 is so placed that the zero mark on the sleeve will coincide with the zero horizontal cross line on the micrometer barrel 23 and then the hole for the taper pin 25 is drilled. This provides a simple method of timing the divisional lines on sleeve 24 and the micrometer frame 23.

For the purpose of turning the spindle 22 downward or upward, I provide a collar 30 surrounding the spindle just below the sleeve 24 and in a sense freely rotatable around the spindle. The collar, as shown in Figure 4, has a central bore to receive the spindle and the wall defining this bore is formed with a series of longitudinally extending notches 30ᵃ approximately semi-circular in cross section and extends from end to end of the collar 30. These notches may be readily machined or broached in the length of the collar 30 at one pass. Disposed within the spindle is a coil spring 28, as shown in Figure 4, which urges a ball 29 outward and into the notches 30ᵃ. The collar 30 in effect constitutes a ratchet and the ball 29 a pawl. The notches 30ᵃ can be of any convenient shape though the deeper the notches the greater the shear or torque which is placed on the ball 29. The depth of the serrated notches should be such as not to allow over one-fourth or one-fifth of the diameter of the ball to protrude into the notches. It will be seen that when turning force is applied to the knurled collar 30 as, for instance, to rotate the spindle in a direction to be carried downward against the work being tested, that the ratchet mechanism will hold the spindle and collar in engagement with each other until the resistance to downward movement of the spindle is greater than the resistance of spring 28 and of ball 29. The construction assures a more accurate reading being taken than if the collar 30 were fast to the spindle, and assures that the spindle 22 will be set down against the plunger 16 with the same tension for successive tests. In other words, the tension is never greater than that necessary to overcome the resistance of the ball 29 and when the resistance to downward movement of the spindle is greater than the resistance exerted by the spring on the ball, the collar 30 will simply rotate around the spindle without forcing it any further downwardly. The same is true with regard to forcing the spindle upwardly against the adjustment screw 26. The divisional lines on the micrometer depth gauge may be of any proportion either in thousandths of an inch or any other convenient division. The depth gauge as shown in Figure 1 is slidably carried in the web 7ᵇ and clamped in any position by the set screw 31. This set screw bears against a follower 32 which prevents the set screw from damaging the finish on the micrometer barrel 23.

Slidably mounted for vertical movement in the frame 1ᵃ is a horizontally disposed carrying handle 33 having downwardly extending arms extending through lugs 1ᵇ projecting laterally from the frame 1ᵃ. The two vertical arms of the handle 33 are turned down at their lower ends to a diameter sufficient to provide a shoulder for the coil springs 35 which bear at their lower ends against the lower lugs 1ᵇ. The downwardly extending legs of the handle 33 are further provided with the pairs of outwardly extending limiting stops 34 which limit the downward and upward movement of the handle through the lugs 1ᵇ. When the handle is pulled upward as in carrying the structure, the lower pins 34, of course, bear against the undersides of the upper lugs 1ᵇ and thus support the weight of the body of this machine. When it is desired to test an object which cannot be disposed between the anvil 4 and the under end of the hub 7ᶜ, then it is necessary to remove the screws 2 to thus disengage the base 1 from the frame 1ᵃ and apply the frame directly against the object to be tested. Under these circumstances, the handle is forced downward, that is, toward the object to be tested and the springs 35, as they are compressed, will exert a compressive force against the lower lugs 1ᵇ which will force the frame firmly against the object to be tested. The coil springs 35, therefore, are to exert a compressive force such as when added to the weight of the frame itself will be greater than the combined forces of the compressive force exerted by coil spring 17 and the kinetic energy exerted on the indentation point 15 and the plunger 16 when the weight 8 falls on the plunger. Of course, these springs 35 have a natural tendency to hold the handle 33 up when not in use.

For the purpose of levelling the structure, a plumb bob 36 is provided mounted as illustrated in Figure 2 upon one of the walls 1ᵃ and coacting with a bracket 36ᵃ having an index point (not shown) coinciding with the lower extremity of the plumb bob when the device is absolutely vertical. Of course, the structure might be provided with an ordinary two-way spirit level in place of the plumb bob, the plumb bob being illustrated to show that a levelling means of an ordinary character can be used for the purpose of making certain that the machine is vertical and perpendicular to the work.

There are two methods of using this structure for the determination of hardness; either by clamping the object to be tested between the anvil and the web or table, as is illustrated in Figure 1, or by removing the base entirely from the upper portion of the tester and then holding the tester down against the object, which object is presumed to be too large to be conveniently clamped between the anvil and the point.

Where the first method is used, it is assumed that the base 1 of the tester is firmly bolted down to a bench and also that the tester is levelled properly by means of the plumb bob or some other suitable levelling device. Weight 8 is lifted until it can be engaged and held up by the pin 13. The micrometer depth gauge has been previously lifted up out of the way and held up by the set screw 31. Then the plunger 16 is lifted, compressing the coil spring 17 until the latch 20 can be slid under the shoulder of the plunger. This brings the indentation point 15 up into the tester removing all danger of damaging the indentation point. Next, the object to be tested is placed upon the anvil 4 and the screw 3 turned upward until the object is clamped in place, as shown in Figure 1. Then the latch 20 is pulled back allowing the coil spring 17 to force the plunger 16 with the indentation point down against the object. The micrometer depth gauge is set at zero, the set screw 31 is loosened and the depth gauge is pushed firmly down until the spindle 22 is touching the plunger 16. The set screw 31 is then tightened; the releasing pin 13 is then retracted, allowing the weight 8 to fall and strike the plunger 16 which forces the indentation point 15 into the object. The spindle 22 of the depth gauge is then run down by means of the ratchet 30 until the ratchet 30 slips. The reading shown on the micrometer depth gauge is in proportion to the hardness of the metal tested. The coil spring 17 holds the indentation point down into the indentation until a reading is had and acts to prevent any recoil of the plunger or indentation point away from the object after the blow has been given.

In the second method of using this tester, it is assumed that the base 1 of the tester is removed entirely by taking out the screws 2. The frame 1ª of the tester is now placed down against the subject to be tested and is levelled by any suitable means. Then the carrying handle 33 is pressed downward until the top set of pins 34 comes in contact with the frame of the tester or, in other words, with the upper lugs 1ᵇ. This compresses the coil springs 35 and this compression of these coil springs assures a certain fixed amount of downward thrust being placed on the tester. This makes it certain that when the weight 8 falls on the plunger 16, the potential force of the weight of the tester itself and the compressive force of the coil springs 35 will be greater than the kinetic force of weight 8 striking plunger 16 and the lifting power of coil spring 17. Otherwise than this, the same procedure is carried out as was detailed with regard to the first method. The basic idea of this second method of operation is to assure that the tester can be held down against the object to be tested, a reading taken, then the same object clamped in the tester and a second reading obtained, which should be exactly the same as the first reading. It will thus be seen that one reading will substantiate the other reading. Sometimes the hardness test is necessary on large forgings or castings which are too large or too inconveniently located to be clamped in the tester. The second method detailed above will permit the tester to be taken to the subject to be tested instead of the subject being brought to the tester.

It is particularly important that the tester be held and pushed down against the object being tested with the tester in a vertical position, as any variations from the vertical will cause the hammer 8 to fall through a different arc of travel before it hits the plunger. Naturally it will cause the hammer to be gravitationally attracted by a different force for different arcs of travel. Therefore, the tester must be held vertical and perpendicular to the object being tested.

For the purpose of lifting the hammer to the full line shown in Figure 1, I have provided each side wall 7 with an arcuate slot 14 through which the fingers may be inserted to lift the hammer.

The slot 13ª is provided for the purpose of compensating for any weakening of the compressive force of spring 17 due to fatigue. When the weight falls on the plunger, it should have exactly the same amount of impact force at all times, but if the compressive force of coil spring 17 should decrease, this would cause a slight decrease in the force with which the indentation point would tend to enter the object being tested, because this spring has a tendency to help push the indentation point down into the object. If this spring weakens, the stop 13 will be set higher in the slot 13ª so as to secure a greater impact force for the weight sufficient to compensate for this weakening of the spring 17.

If the upper end of the plunger 16 were not rounded off, then if the plunger 16 was lifted too much or depressed too much, the weight would strike against one edge or the other of the plunger and this would tend to force the plunger against the plug 19 and the friction thus caused would reduce the force tending to drive the plunger downward, but by rounding the upper end of the plunger, the hammer will always strike close to the center or axial line of the plunger, thus reducing any tendency to force the plunger laterally as well as downward. In other words, it distributes the force exerted by the hammer substantially down through the axial center of the plunger.

While I have illustrated a particular form of my hardness tester and having certain detailed construction, I do not wish to be limited to the details illustrated nor to the exact arrangement of parts except as defined in the accompanying claims.

What is claimed is:—

1. A hardness tester including a supporting frame, a plunger carried thereby, an indentation point carried by the plunger, a weight mounted on the frame and adapted to drop freely a predetermined distance onto the plunger to project the point into the object being tested, manually releasable means for latching the weight at a predetermined position above the plunger and a micro-metric gauge carried by the frame above the plunger and having a vertical spindle in alinement with the plunger and adjustable vertically into engagement with the plunger to measure the depth to which the plunger has been forced into the object.

2. A hardness tester including a supporting frame, a plunger carried thereby and having an indentation point adapted to be forced into the object, a pivoted arm having a weight at its outer end, the arm being pivoted on an axis laterally spaced from and in approximately the same plane as the head of the plunger whereby the weight when released will drop vertically downward onto the plunger and drive the indentation point into the object, the upper end of the plunger being convexly curved whereby the weight will at all times strike the plunger adjacent to its axial center.

3. A hardness tester including a supporting frame, a plunger carried thereby and having an indentation point adapted to be forced into the object, a spring urging the plunger downward with a predetermined force, a pivoted arm having a weight at its outer end, the weight being adapted to strike the plunger when the arm drops to drive the indentation point into the object, the lower face of the pivotal end of the arm being approximately in the same plane as the upper end of the plunger when in contact therewith, the upper end of the plunger having a head, the upper face of which is convexly curved whereby to assure that the weight will strike the plunger at all times closely adjacent its axial center line regardless of any small variations in the positions of the plunger due to a weakening of said spring.

4. A hardness tester including a supporting frame having a horizontal web, a plunger mounted in the web and having an indentation point, a weight mounted upon the frame and adapted to drop upon the plunger to drive the indentation point into the object being tested, the plunger having a head and a latch mounted upon the horizontal web and adapted to be inserted beneath the head of the plunger to hold the plunger upward with its indentation point entirely above the lower face of the web to thus protect the indentation point from accidental damage.

5. A hardness tester including a supporting frame and including a web, a plunger mounted on the web and carrying an indentation point, a weight mounted on the frame for free falling movement into striking contact with the plunger, a handle mounted on the frame for limited vertical movement with relation thereto, and compression springs bearing at one end against the frame and compressible upon downward movement of the handle toward the frame whereby to urge the frame against the object being tested.

6. A hardness tester including a supporting frame having a lower web constituting the bottom of the frame and upwardly extending side walls and having at its upper end a lower laterally projecting pair of lugs and an upper laterally projecting pair of lugs, a plunger, operating through the lower web and carrying an indentation point, a weight mounted on the frame for free falling movement against the plunger to drive the indentation point into the object being tested, a U-shaped handle having vertical legs extending through the pairs of lugs, stops limiting the vertical movement of the handle, and coil compression springs surrounding the lower ends of the legs and bearing against the lower pair of lugs, said springs when the handle is forced downward being compressed and urging the supporting frame downward against an object.

7. A hardness tester including a base having a gooseneck and an upper supporting frame mounted upon the upper end of the gooseneck and having a web extending from the gooseneck over into spaced relation to the base, a screw extending through the base, an anvil disposed at the upper end of the screw, a ball between the anvil and the screw and engaging the center of the anvil, means detachably connecting the base and the upper supporting frame, a plunger mounted in the web for vertical movement and having a head at its upper end, a spring disposed within the web and operatively bearing against the plunger and urging it downward, manually releasable means for supporting the plunger against the tension of the spring, said means when released permitting the plunger to be forced downward through the surface skin of the object to be tested by the tension of said spring, an arm pivotally mounted between the walls of the upper frame and having a weight at its free end, releasable means for supporting said weight and arm in spaced relation to the plunger, said means when released permitting the weight to fall and strike the plunger, and said means for supporting the weight in raised position being adjustable toward or from the plunger to thus control the extent of movement of the weight when falling.

8. A hardness tester including a base having a gooseneck and an upper supporting frame mounted upon the upper end of the gooseneck and having a web extending from the gooseneck over into spaced relation to the base, a screw extending through the base, an anvil disposed at the upper end of the screw, a ball between the anvil and the screw and engaging the center of the anvil, means detachably connecting the base and the upper supporting frame, a plunger mounted in the web for vertical movement and having a head at its upper end, a spring disposed within the web and operatively bearing against the plunger and urging it downward, manually releasable means for supporting the plunger against the tension of the spring, said means when released permitting the plunger to be forced downward through the surface skin of the object to be tested by the tension of said spring, an arm pivotally mounted between the walls of the upper frame and having a weight at its free end, means for supporting said weight and arm in spaced relation to the plunger, said means when released permitting the weight to fall and strike the plunger, the means for supporting the weight in raised position being adjustable toward or from the plunger to thus control the extent of movement of the weight when falling, a micrometer gauge having a barrel and a spindle, the spindle being vertically adjustable within the barrel, and means on the supporting frame for engaging the barrel on the micrometer gauge and supporting it in vertical axial alinement with the plunger, said means permitting the micrometer to be bodily vertically adjusted toward or from the plunger.

9. In a hardness tester, a supporting frame, a plunger carried by the lower end of the frame and having an indentation point adapted to be forced into the object to be tested, a weight operatively mounted upon the frame for free falling movement against the upper end of the plunger to thereby drive the point into the work to be tested, a web extending across the upper portion of the frame and having a vertical bore, a micrometer gauge including a spindle and a barrel in which the spindle is adjustable, the barrel being disposed in said bore, and means adjustable through said web to clamp the barrel of the gauge in lowered position with the lower end of the spindle in contact with the head of the plunger, the free end of the weight being forked to accommodate the spindle when the weight falls and strikes the plunger.

10. A hardness tester including a base having an upwardly extending portion at one end, a vertically movable screw carried by the base at the other end thereof and having an anvil loosely fitted upon the screw for tilting movement in all directions, an upper supporting frame detachably mounted upon the upwardly extending portion of the base and including a web at its lower end having a bore disposed immediately above the anvil, the upper end of the bore being countersunk and screw threaded, the frame also including side walls extending upwardly from said web and connected by a web at their upper ends, a collar having screw threaded engagement with the countersink in the first named web, a plunger extending through the collar and into said bore, the plunger having a head at its upper end and an indentation point at its lower end, a spring disposed within the said bore and urging said plunger downward, the head of the plunger having a central recess and the upper face of the head being concavely curved, a latch mounted on the web and adapted to engage beneath the head to hold the plunger raised, a micro-metric gauge having a spindle, a barrel and a sleeve carried by the spindle and embracing the lower end of the barrel, the barrel being mounted in said uppermost web for vertical adjustment, means for rotating the spindle within the barrel to raise the spindle or lower it into contact with the head of the plunger, an arm pivoted between said walls of the upper frame and having a weight at its upper end adapted to strike the plunger, the weight being forked to accommodate the spindle as the weight falls, the pivot of said arm being so disposed that the arm will strike the plunger when the weight and arm are at an angle of 90° to the axis of the plunger, and means carried by one of said walls for supporting said weight in a raised position, said means being releasable and being adjustable toward or from the plunger.

11. A hardness tester, including a supporting frame having a web constituting the lower end of the frame, a plunger operating through the web and carrying an indentation point, an impact element carried by the frame constructed and arranged to strike the head of the plunger to project the point of the plunger beyond the web and into the work, releasable means for holding the impact element away from the plunger head, a handle carried by that end of the frame remote from the plunger and having longitudinal movement independent of the frame, spring means associated with the handle and frame and resiliently urging the handle away from the frame, said spring means, when the web is placed against the work and the handle forced inward, resiliently urging the frame against the work.

12. A hardness tester, including a supporting frame having a web constituting the lower end of the frame, a plunger operating therethrough and carrying an indentation point and an impact element carried by the frame constructed and arranged to strike the head of the plunger to project its point beyond the web and into the work, releasable means for holding the impact element away from the plunger head, a handle extending across that end of the frame remote from the plunger and having legs extending parallel to the frame, elements on the frame through which the legs pass, and springs carried by the frame and resisting movement of the handle towards the frame, said springs, when the web is placed against the work and the handle forced inward, resiliently urging the frame against the work.

DON W. BLEVANS.